United States Patent
Agami

(10) Patent No.: US 9,429,481 B2
(45) Date of Patent: Aug. 30, 2016

(54) APPARATUS AND METHOD FOR MEASURING TOTAL AIR TEMPERATURE WITHIN AN AIRFLOW

(75) Inventor: Mark Agami, Reading, MA (US)

(73) Assignee: Ametek, Inc., Berwyn, PA (US)

(*) Notice: Subject to any disclaimer, the term of this patent is extended or adjusted under 35 U.S.C. 154(b) by 454 days.

(21) Appl. No.: 13/600,803

(22) Filed: Aug. 31, 2012

(65) Prior Publication Data

US 2014/0064330 A1 Mar. 6, 2014

(51) Int. Cl.
*G01K 1/16* (2006.01)
*G01K 13/02* (2006.01)

(52) U.S. Cl.
CPC .................. *G01K 13/028* (2013.01)

(58) Field of Classification Search
CPC ........... G01K 1/16; G01K 1/02; G01K 1/023
USPC ....... 73/147, 170.01, 170.02, 170.11, 170.12
See application file for complete search history.

(56) References Cited

U.S. PATENT DOCUMENTS

| | | | | |
|---|---|---|---|---|
| 2,588,840 | A * | 3/1952 | Howland | 374/138 |
| 3,512,414 | A * | 5/1970 | Rees | 374/148 |
| 3,954,508 | A | 5/1976 | Derby | |
| 4,243,402 | A | 1/1981 | Sensi | |
| 4,765,751 | A * | 8/1988 | Pannone et al. | 374/143 |
| 5,917,145 | A | 6/1999 | Parent et al. | |
| 6,543,298 | B2 | 4/2003 | Cronin et al. | |
| 6,609,825 | B2 | 8/2003 | Ice et al. | |
| 6,941,805 | B2 | 9/2005 | Seidel et al. | |
| 7,441,948 | B2 | 10/2008 | Bernard et al. | |
| 8,864,370 | B2 * | 10/2014 | Dijon et al. | 374/138 |
| 2004/0177683 | A1 | 9/2004 | Ice | |
| 2005/0232331 | A1 | 10/2005 | Severson | |
| 2008/0151963 | A1 | 6/2008 | Sandnas et al. | |
| 2008/0285620 | A1 | 11/2008 | Benning et al. | |
| 2009/0154522 | A1 | 6/2009 | Kulczyk | |
| 2011/0013664 | A1 * | 1/2011 | Benning et al. | 374/138 |
| 2013/0163636 | A1 * | 6/2013 | Parsons | 374/158 |
| 2013/0315283 | A1 * | 11/2013 | Parsons | 374/208 |

FOREIGN PATENT DOCUMENTS

| | | |
|---|---|---|
| EP | 0 928 958 | 7/1999 |
| FR | 2 680 872 | 3/1993 |
| JP | 2000 088667 | 3/2000 |
| WO | WO 01/27579 | 4/2001 |

OTHER PUBLICATIONS

Search Report and Written Opinion for PCT/US2013/056710 mailed Jun. 30, 2014.

(Continued)

*Primary Examiner* — Gail Kaplan Verbitsky
(74) *Attorney, Agent, or Firm* — RatnerPrestia

(57) ABSTRACT

Total air temperature (TAT) measurement systems, apparatus, and methods for measuring TAT within an airflow are disclosed. A TAT within an airflow may be measured by (1) positioning a probe within an airflow, the probe including an airfoil and a wedge defining a single channel, the single channel including a temperature sensor; (2) receiving a portion of the airflow through the single channel; and (3) determining TAT for the received portion of the airflow using measurements from the temperature sensor.

13 Claims, 6 Drawing Sheets

(56) References Cited

OTHER PUBLICATIONS

International Search Report and Written Opinion for PCT/US2014/049857 mailed Oct. 27, 2014.

International Preliminary Report on Patentability for Application No. PCT/US2013/056710 dated Mar. 3, 2015.

* cited by examiner

APPARATUS AND METHOD FOR MEASURING TOTAL AIR TEMPERATURE WITHIN AN AIRFLOW

FIELD OF THE INVENTION

The field of the invention relates generally to temperature measurement. More specifically, it relates to total air temperature (TAT) sensors and methods for measuring TAT within an airflow.

BACKGROUND OF THE INVENTION

Jet powered aircraft require accurate measurement of air temperature for input to an air data computer and other airborne systems to optimize engine performance. Total air temperature (TAT) sensors are used to measure temperature at various stages of an engine to determine flight parameters, including static temperature, true airspeed computation, fuel consumption, and turbine engine control. Conventional TAT sensors include a temperature sensor located within a probe that can be immersed within an airflow. The temperature sensor is used to compute the TAT of the engine at various stages. The accuracy of conventional TAT sensors, however, may be compromised at higher speeds (e.g., speeds above Mach 0.6).

SUMMARY OF THE INVENTION

The present invention is embodied in a TAT measurement system, apparatus, and method for measuring TAT within an airflow. A probe for measuring temperature within an airflow may include a flange configured for attachment to an aircraft, a support coupled to the flange, and a temperature measurement apparatus coupled to the support to receive the airflow. The temperature measurement apparatus may include an airfoil having a leading edge and first and second surfaces extending away from the leading edge. The leading edge of the airfoil may be positioned to receive the airflow. The temperature measurement apparatus may also include a wedge having a first surface and a second surface opposite the first surface, the first surface of the wedge facing the second surface of the airfoil, defining a channel between the airfoil and the wedge, and a temperature sensor positioned within the channel between the airfoil and the wedge.

Methods of measuring total air temperature (TAT) within an airflow may include the steps of (1) positioning a probe within an airflow, the probe including an airfoil and a wedge defining a single channel, the single channel including a temperature sensor; (2) receiving a portion of the airflow through the single channel; and (3) determining TAT for the received portion of the airflow using measurements from the temperature sensor.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. Also, lines without arrows connecting components may represent a bi-directional exchange between these components. According to common practice, the various features of the drawings are not drawn to scale. On the contrary, the dimensions of the various features may be arbitrarily expanded or reduced for clarity. Included in the drawings are the following figures.

DETAILED DESCRIPTION OF THE INVENTION

Figure 1:
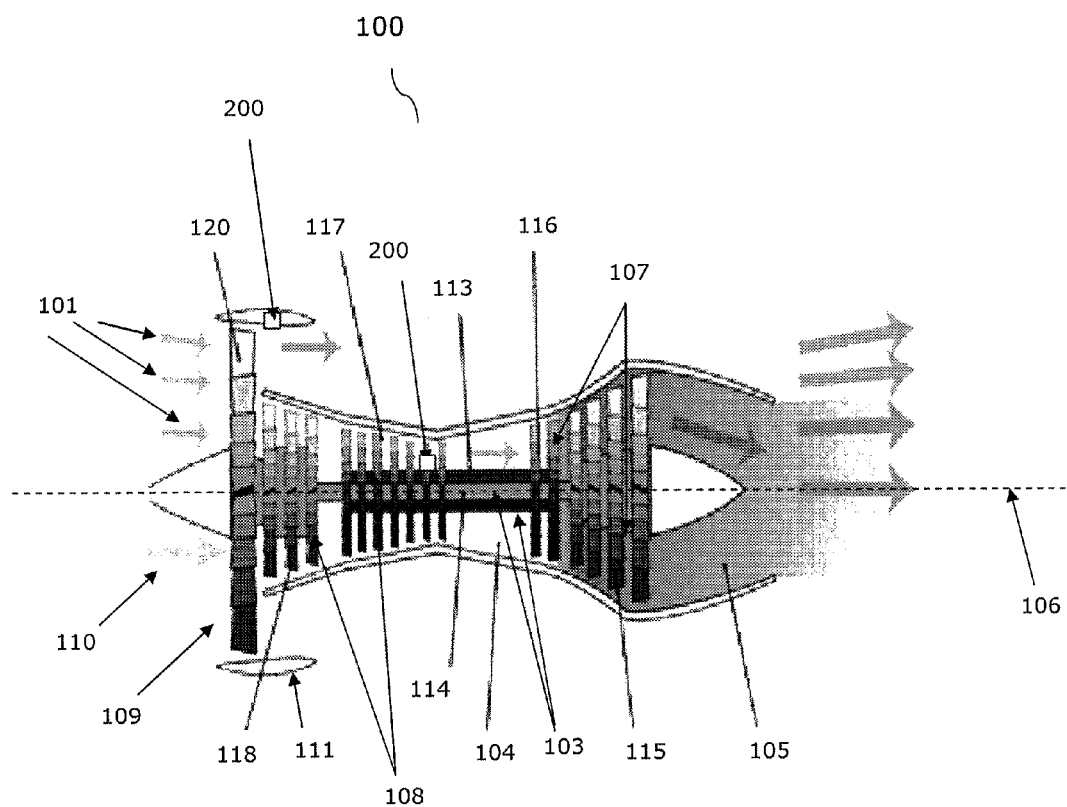
FIG. 1 is a 2-dimensional cross sectional view of an aircraft engine with multiple TAT sensors in accordance with aspects of the present invention.

FIG. 1 is a 2-dimensional view of an aircraft engine 100. In the embodiment illustrated in FIG. 1, the aircraft engine 100 includes a fan 120, a high-pressure compressor 117 and low-pressure compressor 118 (collectively referred to as "compressor 108"), a high-pressure turbine 116 and low-pressure turbine 115 (collectively referred to as "turbine 107"), and a combustion chamber 104. For the purposes of this application, the generic terms "compressor 108" and "turbine 107" will be used in place of specific terms high-pressure compressor 117, low-pressure compressor 118, high-pressure turbine 116, and/or low-pressure turbine 115. Airflow 101 enters the compressor 108 by travelling through air intake 109. The compressor 108 squeezes air that enters it into progressively smaller areas, resulting in an increase in air pressure. The increased air pressure results in an increase in the energy potential of the air. In the combustion chamber 104 this air is mixed with fuel and then ignited. This provides a high temperature, high energy airflow. The turbine 107 rotates about a high-pressure shaft 113 and low-pressure shaft 114 (collectively referred to as "shaft 103") to extract energy from the airflow 101 and converts it into useful work. The high-energy airflow out of the combustion chamber 104 enters the turbine 107, causing the turbine's blades to rotate. A nozzle 105 is the exhaust duct of the aircraft engine 100. The energy depleted airflow that passes through the turbine 107, in addition to the colder air that bypasses the engine core, produces a force when exiting the nozzle 105 that acts to propel the aircraft engine 100.

A centerline 106 extends along the low-pressure shaft 114 of the aircraft engine 100. The engine cowling 111 is designed to straighten incoming airflow 101 such that it is parallel to the centerline 106. In use, however, the direction of the straightened airflow varies depending on airspeed and the direction of the incoming airflow 101. Airflow that flows parallel to the centerline 106 is referred to herein as standard airflow 110. Airflow 101 that does not travel parallel to the centerline 106 is referred to herein as nonstandard airflow.

Aircraft engine 100 may use one or more sensors to measure temperature at one or more stages of the engine. In FIG. 1, two probes 200 for measuring TAT in accordance with embodiments of the present invention are mounted within the aircraft engine 100. The placement of the probes 200 in FIG. 1 is exemplary. Those of ordinary skill in the art will understand from the description herein that a single probe or multiple probes may be placed in various locations of the aircraft engine 100. TAT sensors are typically used to determine flight parameters, including static temperature, true airspeed computation, fuel consumption, and turbine engine control.

Figure 2:
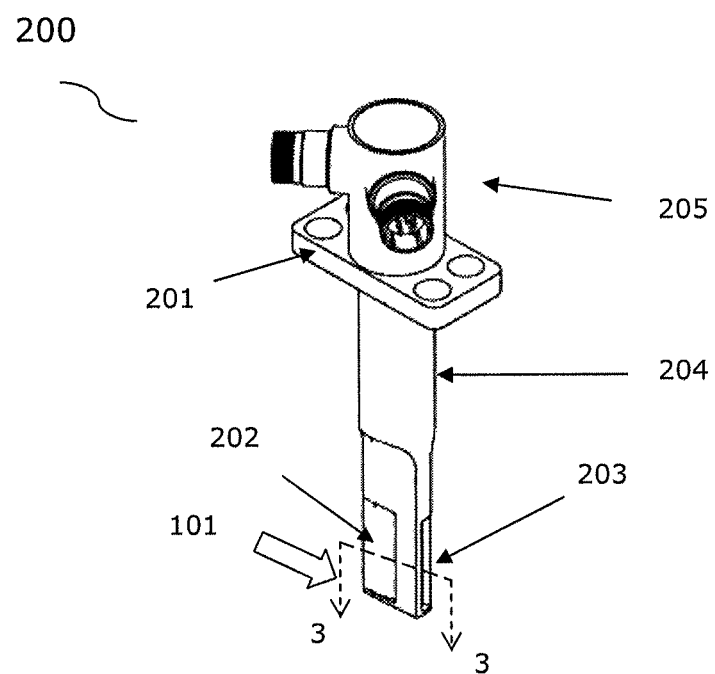
FIG. 2 is a perspective view of a total air temperature (TAT) sensor in accordance with aspects of the present invention.

FIG. 2 is a perspective view of a probe 200 for measuring temperature within the airflow. The illustrated probe 200 includes a flange 201, a support 204 coupled to the flange 201, and a temperature measurement apparatus 206 (FIGS. 3-5) coupled to the support 204. The flange 201, support 204, and temperature measurement apparatus 206 may be cast as a single piece of metal (such as stainless steel or aluminum) or may be formed separately and assembled.

The support 204 extends from a first surface of the flange 201. Electrical connectors 205 extend from a second surface of the flange that is opposite the first surface. The electrical connectors 205 provide an interface between the monitoring equipment within an aircraft (not shown) and the sensor(s) within the probe, which will be described in further detail below. The monitoring circuits include electronics or electrical circuits of the type known to one of skill in the art for use with conventional TAT sensors for measuring TAT. The flange 201 connects the TAT sensor 200 to the aircraft engine 100 such that the probe 204 is located within the airflow 101 and the electrical connectors 205 are located beneath the skin of the aircraft engine 100. The probe 204 includes an inlet 202 through which airflow 101 enters the probe 204. Airflow 101 that enters the inlet 202 of the probe 204 may exit an outlet 203 of the probe 204.

Figure 3:
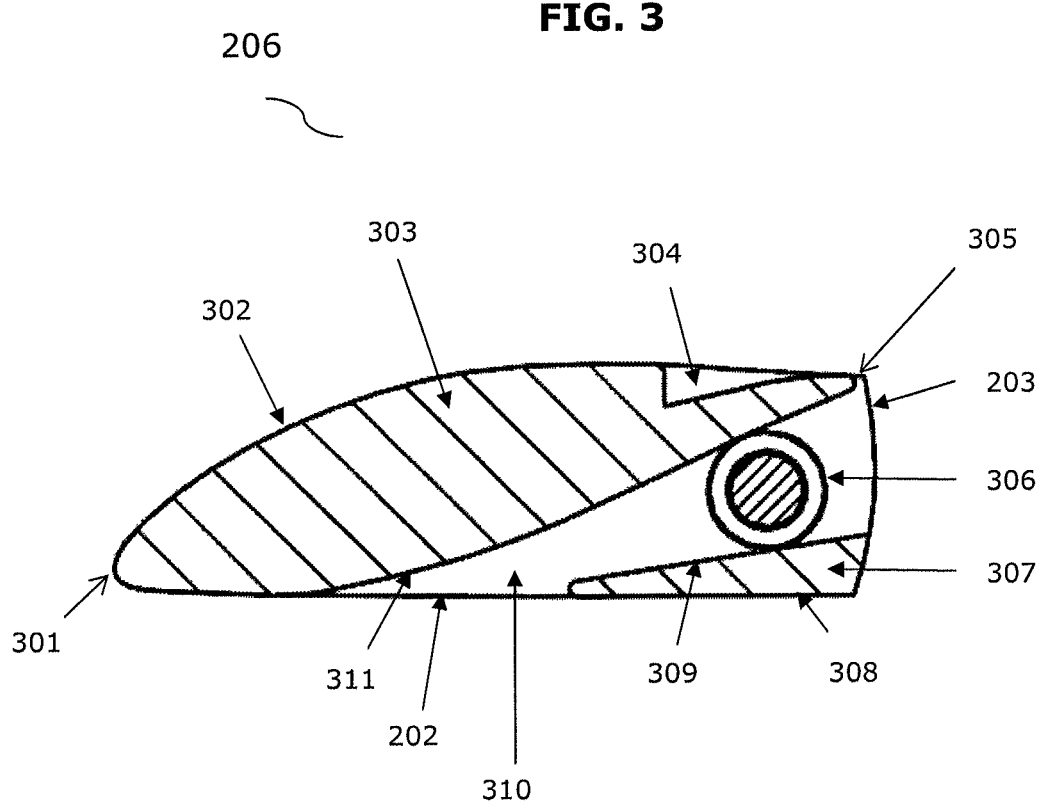
FIG. 3 is a cross sectional view of the TAT sensor of FIG. 2 illustrating a single airfoil, wedge, channel, and temperature sensor.

FIG. 3 is a 2-dimensional view of a cross section of the probe 200 (FIG. 2) illustrating aspects of the temperature measurement apparatus 206. Temperature measurement apparatus 206 includes an airfoil 303, a wedge 307, and a temperature sensor 306 positioned between the airfoil 303 and wedge 307. A leading edge of the airfoil 303 protects the temperature measurement apparatus 206 from impact by, for example, hail, ice, sand, and birdstrikes. The airfoil 303 protects the components of the temperature measurement apparatus 206 from high speed impact with any of the aforementioned materials.

In the illustrated embodiment, a single channel 310 separates the airfoil 303 and the wedge 307 and provides a pathway for airflow to reach the temperature sensor 306. The airfoil 303 has a leading edge 301 and a trailing edge 305. A first surface 302 and a second surface 311 each have convex shapes adjacent to the leading edge 301 of the airfoil 303. The first surface 302 and the second surface 311 extend away from the leading edge 301 of the airfoil 303 and towards the trailing edge 305 of the airfoil 303. An optional gap 304 may be located on the first surface of the airfoil 303 following its convex shape. In the illustrated embodiment, the optional gap 304 may be triangular in shape. The first surface 302 and second surface 302 may each have a straight portion following their respective convex shapes.

A wedge 307 is located opposite the second surface of the airfoil 303. The wedge 307 has a first surface 309 and second surface 308 opposite the first surface 309. The single channel 310 is located between the second surface 311 of the airfoil 303 and first surface 309 of the wedge 307. The channel 310 contains an inlet 202, where airflow enters, and an outlet 203, where airflow 101 may exit.

The temperature sensor 306 is located within the single channel 310 of the temperature measurement apparatus 206. More specifically, the temperature sensor 306 is positioned between the straight portion of the second surface 311 of the airfoil 303 and the first surface 309 of the wedge 307. In one embodiment, the temperature sensor is a resistance temperature detector (RTD) used to measure temperature by correlating the resistance of the RTD element with temperature. The RTD may be a length of fine coiled wire wrapped around a core (e.g., ceramic or glass) or thin film variety in which the resistance is a conductive pattern on a small ceramic chip. Airflow 101 enters the channel's inlet 202, and immerses the temperature sensor 306. The airflow 101 then exits the channel's outlet 203. The cross section of the probe 204 is designed to slow the airflow's 101 velocity at the temperature sensor 306 in order to measure the TAT.

Conventional temperature measurement apparatuses include two airfoils and two channels. In such temperature measurement apparatuses, a leading channel is used to siphon air to the rear of the probe, with the second channel encompassing the temperature sensor. In such designs, at high speeds (e.g., above Mach 0.6) airflow may reverse itself within the first channel, leading to degradation of the probe's accuracy. By using a single airfoil and channel, the present invention provides unexpected favorable outcomes with respect to recovery error (i.e., the error in measuring TAT due to an incomplete conversion of air speed to temperature).

Figure 4:
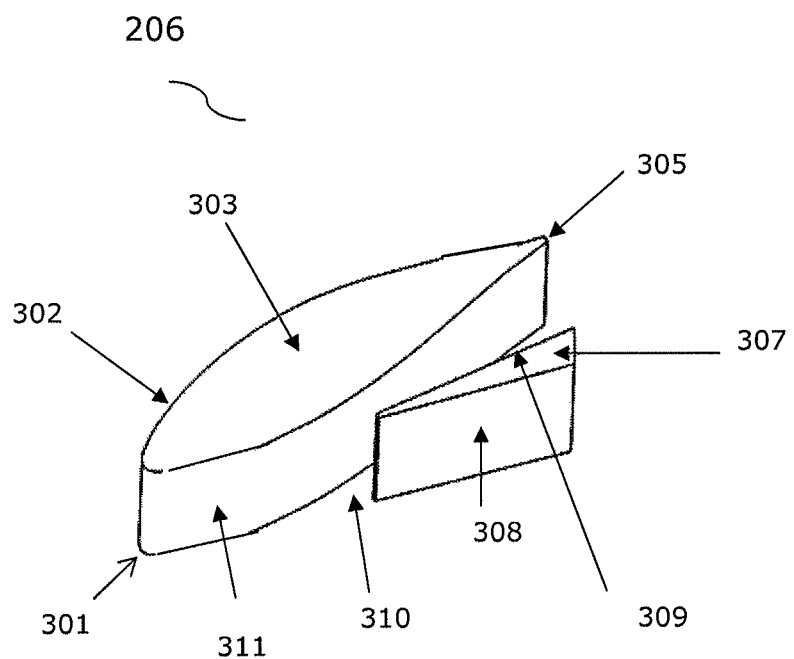
FIG. 4 is a perspective view of the airfoil and wedge of the temperature measurement apparatus of FIG. 3.

FIG. 4 is a perspective view of the airfoil 303 and wedge 307 of the temperature measurement apparatus 206 of FIG. 3. As illustrated in FIG. 4, the wedge 307 is opposite the second surface 311 of the airfoil 303. The perspective view of the temperature measurement apparatus 206 provides another view of the leading edge 301, trailing edge 305, first surface 302 and second surface 311 of airfoil 303. A different view of first surface 309 and second surface 308 of wedge 307 can also be seen, as well as a different perspective of the single channel 310 that is formed between the second surface 311 of the airfoil and the first surface 309 of the wedge. Although the temperature sensor 306 is not illustrated in FIG. 4, the temperature sensor 306 would be located within the channel 310 of a fully formed probe.

Figure 5:
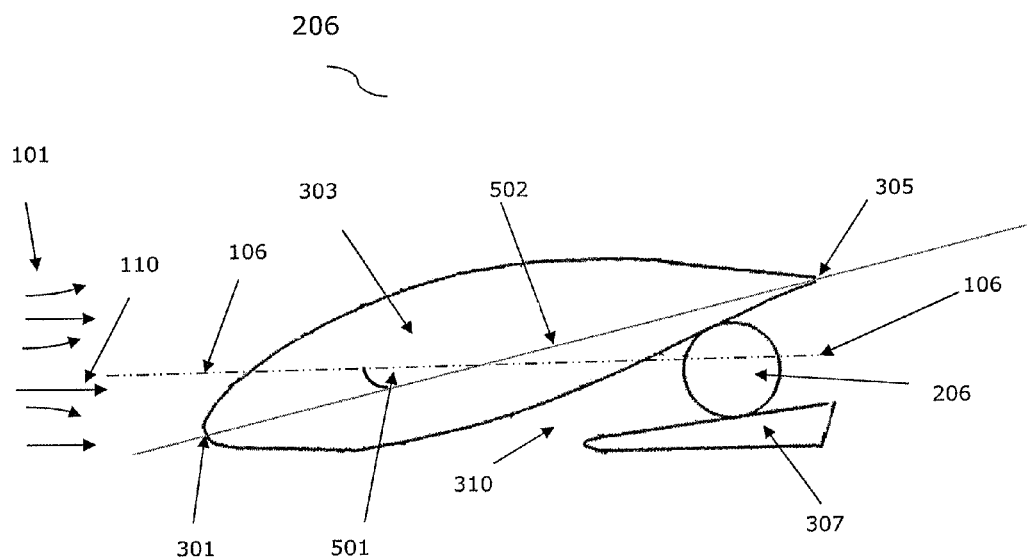
FIG. 5 is a another cross sectional view of the airfoil, wedge, channel, and temperature sensor of FIG. 3 depicting chord angle and airflow in accordance with aspects of the present invention.

FIG. 5 depicts an embodiment of the temperature measurement apparatus 206 overlaid upon the centerline 106 of an aircraft engine 100 (FIG. 1). A straight line that intersects the airfoil's leading edge 301 and the airfoil's trailing edge 305 is defined herein as the chordline 502. The temperature measurement apparatus 206 is directed with the probe 200 (FIG. 2) such that the chordline 502 has a specific angular relationship with respect to the centerline 106 when the probe 200 is installed. The intersection of the centerline 106 and the chordline 502 creates an angle 501. In an embodiment of the present invention, the chordline 502 of the airfoil 303 forms an angle between about 12 degrees and about 18 degrees. Preferably the angle may be between about 14 degrees and about 16 degrees, and more preferably is about 15 degrees. In an exemplary embodiment of the present invention, recovery error associated with probe to probe variation and airflow angle variation is reduced over conventional probe designs by such angular relationships, which reduces recovery error—resulting in higher engine thrust.

Figure 6:
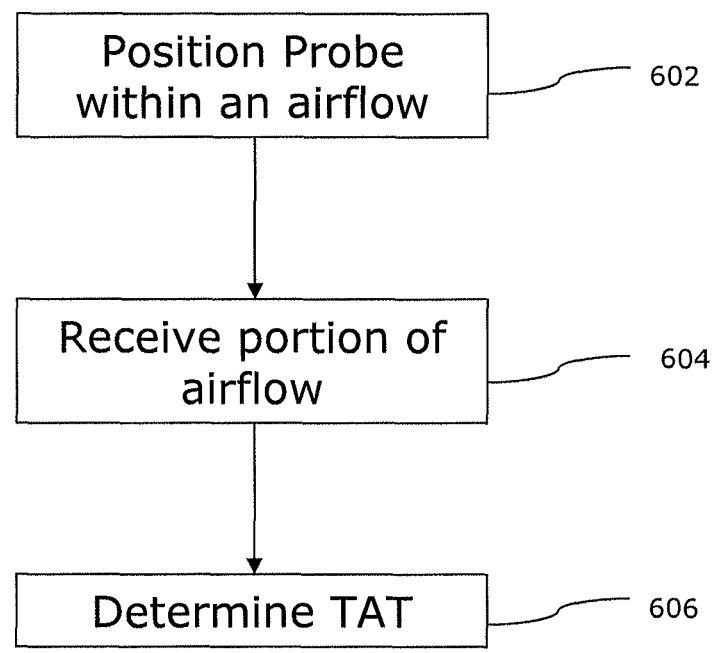
FIG. 6 is a flow chart depicting steps for measuring total air temperature (TAT) within an airflow in accordance with aspects of the present invention.

FIG. 6 is a block diagram of the process for measuring temperature within an airflow 101. In block 602, a probe 204 is positioned within an airflow 101. As discussed above, the probe includes temperature measurement apparatus 206, which encompasses an airfoil 303, a wedge 307, and a single channel 310 that is situated between the second surface 311 of the airfoil 303 and the first surface 309 of the wedge 307. Within the single channel 310 of the temperature measurement apparatus 206 is a temperature sensor 306, which is used to compute TAT.

In block 604, a portion of the airflow 101 is received through the single channel 310 of the temperature measurement apparatus 206. The airflow 101 entering the channel 310 immerses the temperature sensor 306.

In block 606, TAT is determined for the portion of the airflow 101 that is received through the single channel 301. The temperature sensor 306 uses measurements from the airflow 101 that immerses the temperature sensor 306 to determine TAT. TAT is the maximum temperature which can be attained by 100% conversion of the kinetic energy of the flight. Suitable algorithms for determining TAT will be understood by one of skill in the art from the description herein.

As used herein, the terms convex, concave, straight, and parallel mean at least substantially convex, concave, straight, or parallel, respectively. Thus, for example, a straight portion referred to herein would encompass straight or substantially straight portions (e.g., portions with a slight curvature).

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A probe for measuring temperature within an airflow, the probe comprising:
    a flange configured for attachment to an aircraft;
    a support coupled to the flange; and
    a temperature measurement apparatus coupled to the support to receive the airflow, the temperature measurement apparatus comprising:
        an airfoil having a leading edge, a trailing edge, and first and second surfaces extending away from the leading edge, the leading edge of the airfoil positioned to receive the airflow;
        a wedge having a leading edge and first and second opposed surfaces extending away from the leading edge, the leading edge of wedge positioned forward of the trailing edge of the airfoil such that the leading edge of the wedge receives the airflow before the trailing edge of the airfoil, the first surface of the wedge facing the second surface of the airfoil, defining a channel between the airfoil and the wedge; and
        a temperature sensor positioned within the channel between the airfoil and the wedge.

2. The probe of claim 1, wherein the first surface of the airfoil has a convex shape adjacent to the leading edge.

3. The probe of claim 2, wherein the second surface of the airfoil has a convex shape adjacent the leading edge followed by a straight portion.

4. The probe of claim 3, wherein the first surface of the wedge has a straight portion and the temperature sensor is positioned between the straight portions of the second surface of the airfoil and the first surface of the wedge.

5. The probe of claim 2, wherein the first surface of the airfoil has a straight portion following the convex portion.

6. The probe of claim 2, further comprising:
    a triangular gap following the convex shape of the first surface of the airfoil.

7. The probe of claim 1, wherein the probe is oriented such that a chordline of the airfoil forms an angle between about 12 degrees and about 18 degrees with respect to a standard direction for the airflow when the flange is attached to the aircraft.

8. The probe of claim 1, wherein the probe is oriented such that a chordline of the airfoil forms an angle between about 14 degrees and about 16 degrees with respect to a standard direction for the airflow when the flange is attached to the aircraft.

9. The probe of claim 1, wherein the probe is oriented such that a chordline of the airfoil forms an angle of about 15 degrees with respect to a standard direction for the airflow when the flange is attached to the aircraft.

10. A method of measuring total air temperature (TAT) within an airflow, the method comprising:
    positioning a probe within an airflow, the probe including an airfoil having a leading edge, a trailing edge, and an airfoil surface and a wedge having a leading edge and a wedge surface facing the airfoil surface, the leading edge of the wedge positioned forward of the trailing edge of the airfoil, the airfoil surface and the wedge surface defining a single channel, with a temperature sensor positioned within the single channel;
    receiving a portion of the airflow through the single channel such that the airflow is received by the leading edge of the wedge before it is received by the trailing edge of the airfoil; and
    determining TAT for the received portion of the airflow using measurements from the temperature sensor.

11. A method in accordance with claim 10, wherein the positioning step comprises:
    orienting the probe such that a chordline of the airfoil forms an angle between about 12 degrees and about 18 degrees with respect to a standard direction for the airflow.

12. A method in accordance with claim 10, wherein the positioning step comprises:
    orienting the probe such that a chordline of the airfoil forms an angle between about 14 degrees and about 16 degrees with respect to a standard direction for the airflow.

13. A method in accordance with claim 10, wherein the positioning step comprises:
    orienting the probe such that a chordline of the airfoil forms an angle about 15 degrees with respect to a standard direction for the airflow.

* * * * *